(12) United States Patent
Thakur et al.

(10) Patent No.: US 9,146,943 B1
(45) Date of Patent: Sep. 29, 2015

(54) DETERMINING USER CONTENT CLASSIFICATIONS WITHIN AN ONLINE COMMUNITY

(71) Applicant: Google Inc., Mountain View, CA (US)

(72) Inventors: Madhukar Narayan Thakur, San Jose, CA (US); Nandini Kappiah, Los Gatos, CA (US); Guangqi Ye, San Francisco, CA (US); Dharmeshkumar Jayantilal Mokani, San Jose, CA (US); Karen Lees, San Francisco, CA (US); Oleg Chernyakhovskiy, Santa Clara, CA (US); Andrew Granoff, San Francisco, CA (US); Luis Alberto Rojas Marambio, Sunnyvale, CA (US); Francesco Xavier Llora Fabrega, Mountain View, CA (US); Morgan Avery Conbere, San Francisco, CA (US)

(73) Assignee: Google Inc., Mountain View, CA (US)

(*) Notice: Subject to any disclaimer, the term of this patent is extended or adjusted under 35 U.S.C. 154(b) by 279 days.

(21) Appl. No.: 13/778,090

(22) Filed: Feb. 26, 2013

(51) Int. Cl.
    *G06F 17/30* (2006.01)
(52) U.S. Cl.
    CPC ...... *G06F 17/30286* (2013.01); *G06F 17/3053* (2013.01); *G06F 17/30424* (2013.01); *G06F 17/30938* (2013.01)
(58) Field of Classification Search
    CPC .......... G06F 17/3053; G06F 17/30528; G06F 17/30424; G06F 17/305528; G06F 17/30938; G06F 17/30929

USPC .......................................... 707/748, 750, 754
See application file for complete search history.

(56) References Cited

U.S. PATENT DOCUMENTS

| | | | | |
|---|---|---|---|---|
| 8,346,878 | B2* | 1/2013 | Bhogal et al. | 709/206 |
| 8,751,492 | B1* | 6/2014 | Catane | 707/734 |
| 8,793,255 | B1* | 7/2014 | Bilinski et al. | 707/740 |
| 2005/0060643 | A1* | 3/2005 | Glass et al. | 715/501.1 |
| 2008/0086555 | A1* | 4/2008 | Feinleib | 709/224 |
| 2009/0271391 | A1* | 10/2009 | Kawale et al. | 707/5 |
| 2011/0022602 | A1* | 1/2011 | Luo et al. | 707/748 |
| 2012/0158851 | A1* | 6/2012 | Kelmenson et al. | 709/205 |
| 2012/0209832 | A1* | 8/2012 | Neystadt et al. | 707/723 |
| 2013/0007151 | A1* | 1/2013 | Chen et al. | 709/206 |
| 2013/0159110 | A1* | 6/2013 | Rajaram et al. | 705/14.66 |
| 2013/0191399 | A1* | 7/2013 | Tocaben et al. | 707/748 |

* cited by examiner

*Primary Examiner* — Thanh-Ha Dang
(74) *Attorney, Agent, or Firm* — Patent Law Works LLP

(57) ABSTRACT

The present disclosure includes systems and methods for classifying user content (e.g., spam) within an online community by determining user specific signals and content specific signals, the systems and methods comprising: a user interface module configured to receive user content from the online community, a social signal processing module configured to determine signals from the user content, a user and content classifying module configured to classify user content and configured to compute a decision on the user content, a user content labeling module configured to label the user content, and an execution module configured to execute the decision.

20 Claims, 9 Drawing Sheets

DETERMINING USER CONTENT CLASSIFICATIONS WITHIN AN ONLINE COMMUNITY

BACKGROUND

The present disclosure relates to classifying user content including identifying spam or other abuse within an online community based on processing user-specific and content-specific social signals.

In the last decade or so, social networks have become increasingly popular. Yet, spam and/or account abuse has become an increasingly difficult problem to solve. Many people post content on social networks that others may perceive as spam, for example, excessive advertisements, repetitive posts, unsavory content etc.

SUMMARY

According to one innovative aspect of the subject matter described in this disclosure, a system comprises a processor and a memory storing instructions that, when executed, cause the system to receive user content within an online community, process content-specific and user-specific signals relating to the user content, calculate a score for the user content by using processed signals, classify the user content into a classification based on the score, compute a decision based on the score, and execute the decision.

In general, another innovative aspect of the subject matter described in this disclosure may be embodied in methods that use at least one computing device and include receiving user content within an online community, processing content-specific and user-specific signals relating to the user content, calculating a score for the user content by using processed signals, classifying the user content into a classification based on the score, compute a decision based on the score, and executing the decision.

Other implementations of one or more of these aspects include corresponding systems, apparatus, and computer programs, configured to perform the actions of the methods, encoded on computer storage devices. These and other implementations may each optionally include one or more of the following features. For instance, the operations further include: defining content-specific signals that relate to the frequency of the content and reaction to the content by others and user-specific signals that relate to user reputation; testing the user content score to determine if it is less than a pre-defined threshold and labeling it as valid if it is; testing the user content score to determine if it is more than a pre-defined threshold and labeling it as spam; continuously processing the user-specific and content-specific signals to update the pre-defined criteria and receiving user content including from a group of users, comments, and posts.

For instance, the features include that in some instances: the content-specific signals relate to the frequency of the content and reaction to the content by others and the user-specific signals relate to user reputation; a test of the user content score to determine if it is less than a pre-defined threshold and labeling it as valid if it is; a test of the user content score to determine if it is more than a pre-defined threshold and labeling it as spam; an update of the classification for user-specific and content-specific signals, which are continuously processed and user content from a group of users, comments, and posts.

The systems and methods disclosed below are advantageous in a number of respects. With the ongoing trends and growth in social network communication, it may be beneficial to prevent spam and abuse within the social networks. The systems and methods provide ways for classifying content and limiting or preventing spam and abuse by using a content (spam) determination model that is configured to classify user-specific factors or content-specific factors to determine if content that is provided in a social network qualifies as either spam or valid. The systems and methods use a scoring scheme to classify either content or a particular user to learn of the occurrence of content and a user's reputation. In the event content is determined to be spam or a user's reputation is questionable, the systems and methods either reject or block the content or the user.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

In some implementations, this technology includes systems and methods for classifying user content and determining spam or other abuse within an online community. Specifically, this technology includes systems and methods for processing one or more social signals associated with either a user or user content within the social network, classifying the one or more signals, generating a score based on the classifications, generating a decision, labeling the user content, and executing the decision. The social signals may include user-level or user-specific signals that are used to build the reputation of a user to determine whether he or she is abusing an online social network and content-specific signals that are used to determine whether the content that is provided by a particular user may be spam or abuse. Examples of user-level or user-specific signals may be one or more of the following: 1) time that the user has signed up with the social network, 2) number of followers, 3) number of people that replied to a particular user's posts and comments, 4) number of people that a user follows, 5) number of people that block or mute a particular user, 6) number of posts on popular users (for example, celebrities), 6) number of people a particular user added to his social group and number of people that added him or her back, 7) number of people that interact with a particular user, 8) percentage of posts that are made public, 9)

number of big social groups, 10) whether the user's name is good or bad, 10) total number of the user's contents that people flag as spam/abuse, 11) percentage of the user's content that receives user flags as spam/abuse, 12) total number of the user's contents that are labeled as spam/abuse by trusted human reviewers, 13) percentage of the user's content that are labeled as spam/abuse by trusted human reviewers, 14) total number of people who flag the user's content as spam/abuse, and 15) total number of distinct clusters of similar content made by the user. User-specific signals may be any signals that inform on a user's patterns and reputation.

Examples of content-level signals, when a particular user creates or uploads content (for example, a post, a comment, a photo etc.), include 1) the number of similar type of content created by the user, and 2) the number of people who flag the user's content etc. The signals, whether user-specific or content-specific are used to train a machine model to automatically classify users and their posts and/or comments. As one example, the model is configured to output a score between "0" and "1." When the score computed by the model is over a certain pre-defined threshold, the underlying user or post or comment is automatically classified as "spam." If the score is below a low pre-defined threshold, the system automatically labels the underlying entity as "good" or "valid."

Figure 1:
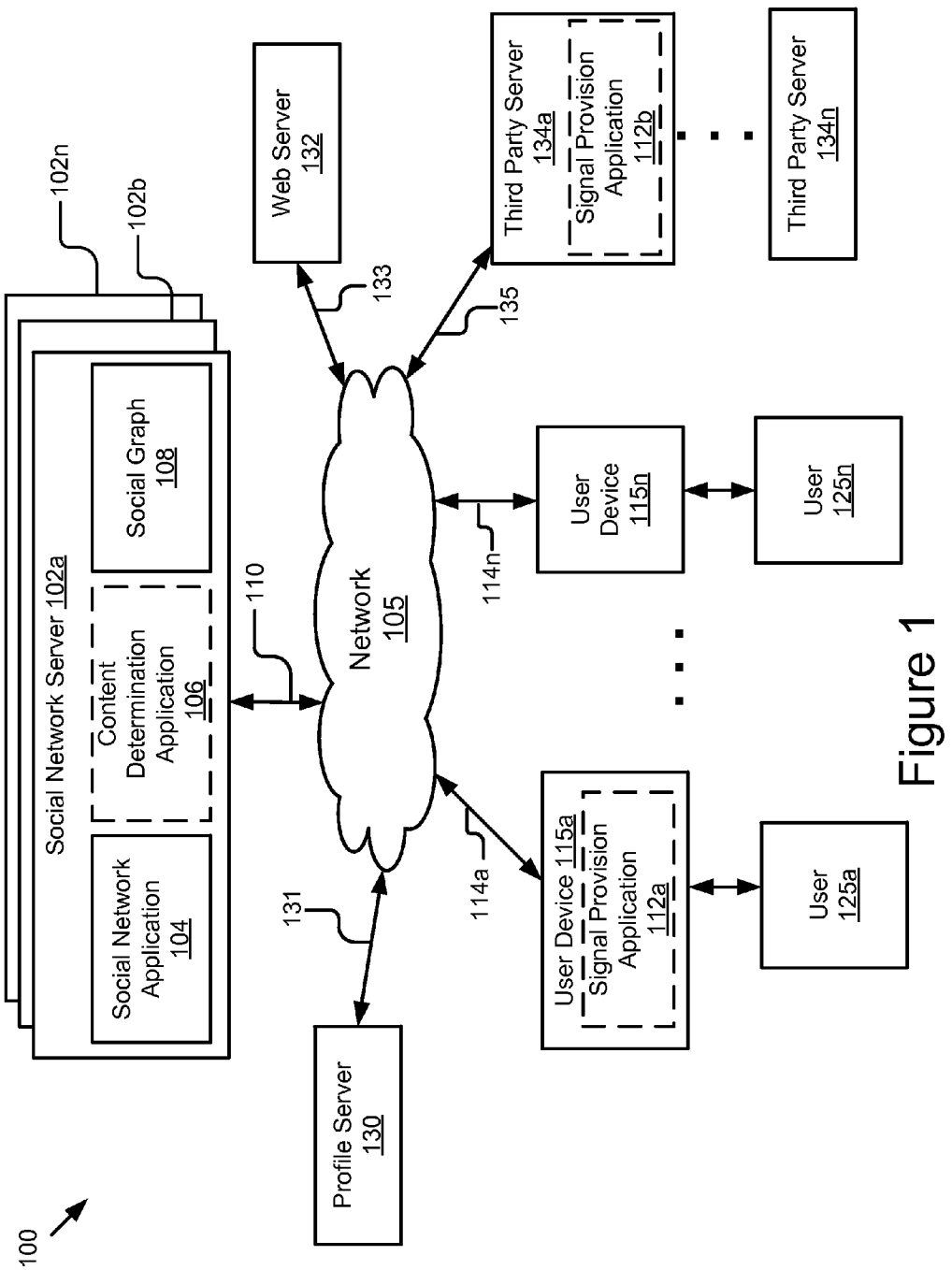
FIG. 1 is a block diagram illustrating an example system for determining content classifications including spam within an online community (for example, social network) including a content determination application.

FIG. 1 is a high-level block diagram illustrating some implementations of systems for determining spam or abuse within an online community. The system 100 illustrated in FIG. 1 provides system architecture for determining spam or abuse within an online community. The system 100 includes one or more social network servers 102a, 102b, through 102n, that may be accessed via user devices 115a through 115n, which are used by users 125a through 125n, to connect to any one of the social network servers 102a, 102b, through 102n. These entities are communicatively coupled via a network 105. Although only two user devices 115a through 115n are illustrated, any numbers of user devices 115n may be used by any number of users 125n.

Moreover, while the present disclosure is described below primarily in the context of providing a framework for classifying content including determining spam or abuse within an online community, for example, a social network, the present disclosure may be applicable to other situations where determining spam or abuse for any purpose that is not related to online communities, may be necessary or desired, or situations where identifying different categories of content may be necessary or desired. For ease of understanding and brevity, the description the present disclosure is described in reference to classifying content and determining spam or abuse within an online community by processing social signals.

The user devices 115a through 115n in FIG. 1 are illustrated by way of example. As indicated above, although FIG. 1 illustrates only two devices, the present disclosure applies to any system architecture having one or more user devices 115, therefore, any number of user devices 115n may be used. Furthermore, while only one network 105 is illustrated as coupled to the user devices 115a through 115n, the social network servers, 102a-102n, the profile server 130, the web server 132, and third party servers 134a through 134n, in practice, any number of networks 105 may be connected to these entities. In addition, although only two third party servers 134a through 134n are shown, the system 100 may include any number of third party servers 134n.

In some implementations, the social network server 102a may be coupled to the network 105, via a signal line 110. The social network server 102a includes a social network application 104, which includes the software routines and instructions to operate the social network server 102a and its functions and operations. Although only one social network server 102a is described here, multiple servers may be present, as illustrated by social network servers 102b through 102n, each with functionality similar to social network server 102a or different.

The term "social network" as used here includes, but is not limited to, any type of social structure where the users are connected by a common feature or link. The common feature includes relationships/connections, for example, friendship, family, work, a similar interest, etc. The common features are provided by one or more social networking systems, for example, those included in the system 100, including explicitly-defined relationships and relationships implied by social connections with other online users, where the relationships form the social graph 108.

The term "social graph" as used here includes, but is not limited to, a set of online relationships between users, for example, provided by one or more social networking systems. As one example, the social network system 100 includes explicitly-defined relationships and relationships implied by social connections with other online users, where the relationships form a social graph 108. In some examples, the social graph 108 may reflect a mapping of these users and how they are related.

It should be understood that the social network server 102a and the social network application 104 are representative of a single social network. Each of the plurality of social network servers 102a, 102b through 102n, may be coupled to the network 105, each having its own server, application, and social graph. For example, a first social network hosted on a social network server 102a may be directed to business networking, a second on a social network server 102b directed to or centered on academics, a third on a social network server 102c (not separately shown) directed to local business, a fourth on a social network server 102d (not separately shown) directed to dating, and yet others on social network server (102n) directed to other general interests or perhaps a specific focus.

A profile server 130 is illustrated as a stand-alone server in FIG. 1. In other implementations of the system 100, all or part of the profile server 130 may be part of the social network server 102a. The profile server 130 may be connected to the network 105, via a line 131. The profile server 130 has profiles for the users that belong to a particular social network 102a-102n. One or more third party servers 134a through 134n are connected to the network 105, via signal line 135. A web server 132 may be connected, via line 133, to the network 105.

The social network server 102a includes a content determination application 106, to which user devices 115a through 115n are coupled via the network 105. In particular, user device 115a may be coupled, via line 114a, to the network 105. The user 125a, via the user device 115a, accesses a social network to provide content. The content determination application 106 processes social signals and determines whether content that is provided may be spam or abusive. In some implementations, a signal provision application 112a and/or 112b is included in the one or more user devices 115a through 115 and/or the third party servers 134a through 134n. In some instances, the signal provision application 112a/112b provides social signals (e.g., posts, messages, images, videos, etc.) to the social network server 102a through 102n.

The user devices 115a through 115n may be a computing device, for example, a laptop computer, a desktop computer, a tablet computer, a mobile telephone, a personal digital assistant (PDA), a mobile email device, a portable game player, a portable music player, a television with one or more processors embedded in the television or coupled to it, or any other electronic device capable of accessing a network.

The network 105 may be of conventional type, wired or wireless, and may have any number of configurations for example a star configuration, token ring configuration, or other configurations. Furthermore, the network 105 may comprise a local area network (LAN), a wide area network (WAN, e.g., the Internet), and/or any other interconnected data path across which one or more devices may communicate.

In some implementations, the network 105 may be a peer-to-peer network. The network 105 may also be coupled to or include portions of one or more telecommunications networks for sending data in a variety of different communication protocols.

In some implementations, the network 105 includes Bluetooth communication networks or a cellular communications network for sending and receiving data for example via short messaging service (SMS), multimedia messaging service (MMS), hypertext transfer protocol (HTTP), direct data connection, WAP, email, etc.

In some implementations, the social network servers, 102a-102n, the profile server 130, the web server 132, and the third party servers 134a through 134n are hardware servers including a processor, memory, and network communication capabilities. One or more of the users 125a through 125n access any of the social network servers 102a through 102n, via browsers in their user devices and via the web server 132.

Figure 2:
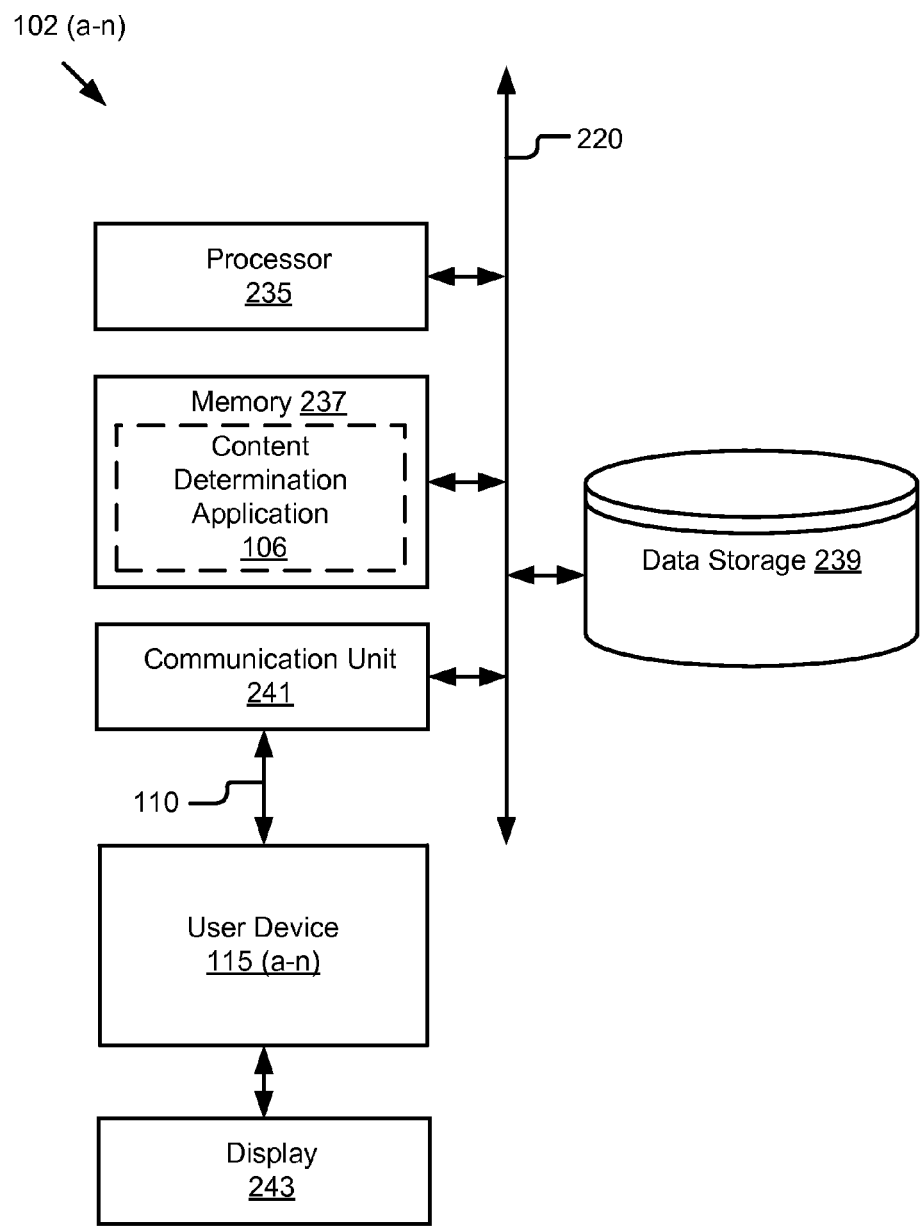
FIG. 2 is a block diagram illustrating example hardware components in some implementations of the system shown in FIG. 1.

FIG. 2 is a block diagram illustrating some implementations of a social network server 102a through 102n including a content determination application 106. In FIG. 2, like reference numerals have been used to reference like components with the same or similar functionality that has been described above with reference to FIG. 1. For those components that have been described above, that description is not repeated here. The social network server 102a-102n generally includes one or more processors, although only one processor 235 is illustrated in FIG. 2. The processor may be coupled, via a bus 220, to memory 237, and data storage 239, which stores information obtained for spam determination, received from any of the other sources identified above. In some implementations, the data storage 239 may be a database organized by user or participant in an online community. In some implementations, the content determination application 106 may be stored in the memory 237.

A user 125a, via a user device 115a, accesses an online community, for example the social network server 102a-102n, via communication unit 241. In some implementations, the user device may be communicatively coupled to a display 243 to display information to the user. The content determination application 106 may reside, in its entirety or parts of it, in the social network server 102a (through 102n). The user device 115a communicates with the social network server 102a using the communication unit 241, via signal line 110.

Figure 3A:
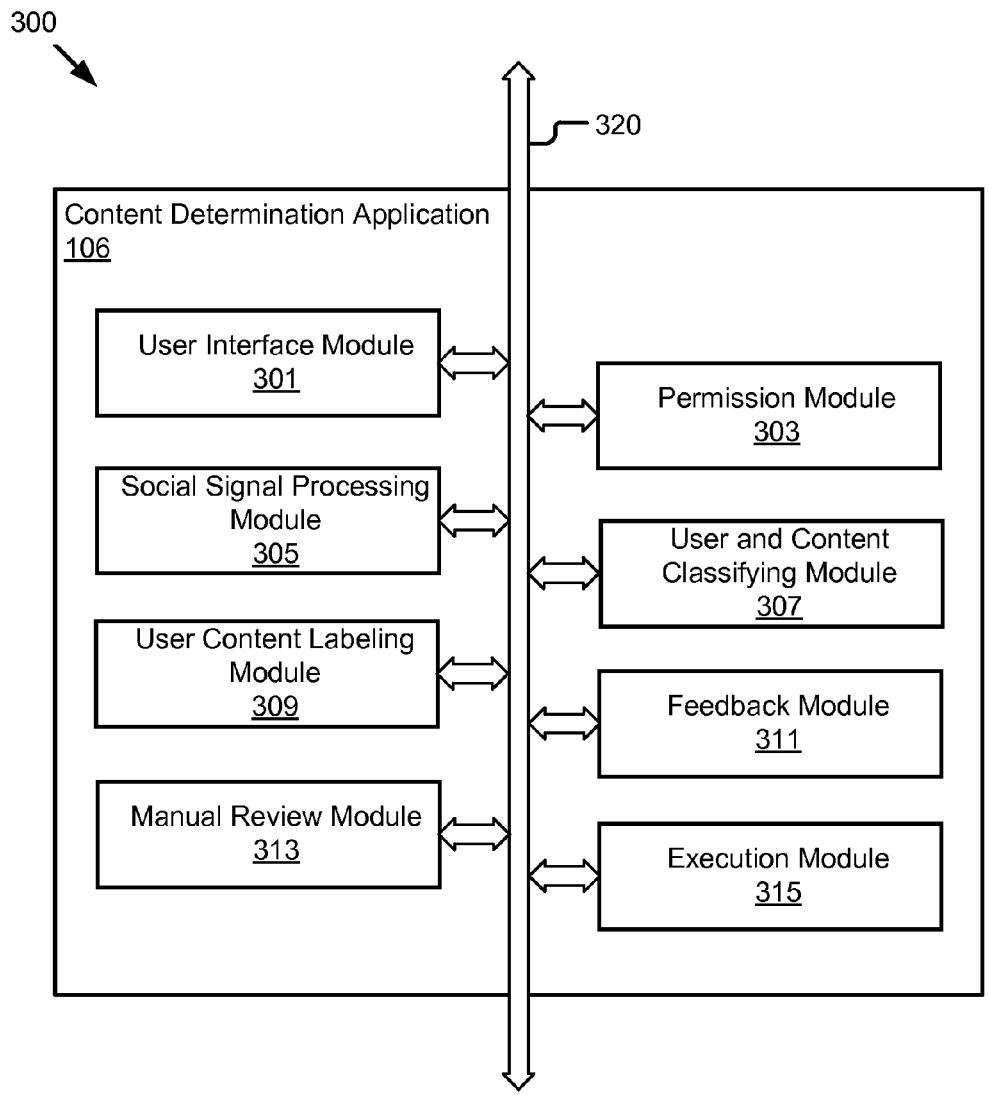
FIG. 3A is a block diagram illustrating an example content determination application and its software components.

Referring now to FIG. 3A, like reference numerals have been used to reference like components with the same or similar functionality that has been described above with reference to FIGS. 1 and 2. For those components have been described above, that description is not repeated here. The content determination application 106, indicated here by reference numeral 300, include various applications or engines that are programmed to perform the functionalities described here. The user interface module 301 receives user content for a social network and/or generates a user interface for displaying user content within a social network. The permission module 303 determines user permissions for viewing and/or editing content in the social network. The social signal processing module 305 processes one or more social signals from the social network. The user and content classification module 307 receives one or more social signals and classifies user content. The user content labeling module 309 labels user content. The feedback module 311 provides feedback based on a decision. The manual review module 313 sends content for manual review by human administrators or the like. The execution module 315 executes an action on the user content.

The content determination application 106 includes applications or engines that communicate over the software communication mechanism 320. Software communication mechanism 320 may be an object bus (for example CORBA), direct socket communication (for example TCP/IP sockets) among software modules, remote procedure calls, UDP broadcasts and receipts, HTTP connections, function or procedure calls, etc. Further, any or all of the communication could be secure (SSH, HTTPS, etc.). The software communication can be implemented on any underlying hardware, for example a network, the Internet, a bus 220 (FIG. 2), a combination thereof, etc.

The user interface module 301 may be software including routines for receiving user content. In some implementations, the user interface module 301 can be a set of instructions executable by the processor 235 to provide the functionality described below for receiving user content from a social network and/or generating a user interface for displaying user content on the social network. In some implementations, the user interface module 301 can be stored in the memory 237 of the social network server 102 (a-n) and can be accessible and executable by the processor 235. In either implementation, the user interface module 301 can be adapted for cooperation and communication with the processor 235, the communication unit 241, data storage 239 and other components of the social network server 102 (a-n) via the bus 220.

In some implementations, the user interface module 301 receives user content from one or more users. For example, the user interface module 301 receives one or more posts, comments, flags, etc., from one or more users of the social network.

In some implementations, the user interface module 301 generates a user interface for displaying information received from one or more modules described below in the content determination application 106. For example, the user interface module 301 generates one or more user interfaces for displaying user profile information, user content, and/or any other information relating to the social network.

The permission module 303 may be software including routines for determining user permissions. In some implementations, the permission module 303 can be a set of instructions executable by the processor 235 to provide the functionality described below for determining user permissions for viewing and/or editing content in the social network. In other implementations, the permission module 303 can be stored in the memory 237 of the social network server 102 and can be accessible and executable by the processor 235. In either implementation, the permission module 303 can be adapted for cooperation and communication with the processor 235, the communication unit 241, data storage 239 and other components of the social network server 102 (a-n), via the bus 220.

In some implementations, the permission module 303 determines user permissions for viewing and/or editing content to maintain user privacy. In some implementations, the permission module 303 determines which users may view and/or edit social network content (e.g., posts, comments, etc.). In other implementations, the permission module 303 determines which users may add content to a social network.

The social signal processing module 305 may be software including routines for processing social signals. In some implementations, the social signal processing module 305 can be a set of instructions executable by the processor 235 to provide the functionality described below for processing one or more social signals from the social network. In some implementations, the social signal processing module 305 can be stored in the memory 237 of the social network server 102 and can be accessible and executable by the processor 235. In either implementation, the social signal processing module 305 can be adapted for cooperation and communication with the processor 235, the communication unit 241, data storage 239 and other components of the social network server 102 and/or the third party server 134 via the bus 220.

In some implementations, the signals are user specific (e.g., user's name, number of followers, percentage of public posts, etc.). In some implementations, the signals are content specific (e.g., number of people who flagged the content as spam, number of similar content, etc.). The social signal processing module 305 processes the signals from the social network (after receiving permission from the permission module 303) and sends the one or more signals and/or the corresponding user content to the user and content classification module 307. In some implementations, the social signal processing module 305 accepts flags and/or complaints about the user content.

The user and content classification module 307 may be software including routines for classifying user content. In some implementations, the user and content classification module 307 can be a set of instructions executable by the processor 235 to provide the functionality described below for receiving one or more social signals and classifying user content. In some implementations, the user and content classification module 307 can be stored in the memory 237 of the social network server 102 and/or the third party server 134 and can be accessible and executable by the processor 235. In either implementation, the user and content classification module 307 can be adapted for cooperation and communication with the processor 235, the communication unit 241, data storage 239 and other components of the social network server 102 (*a-n*), via the bus 220.

In some implementations, the user and content classification module 307 may receive one or more social signals and/or the corresponding user content (for example, one or more user content items) from the social signal processing module 305 and may classify the user content (for example, users, posts, comments, etc.) based on the one or more signals. In some implementations, user and content classification module 307 trains a content determination (e.g., spam determination) model to automatically classify user content. In some implementations, the user and content classification module 307 may send information based on the signals to the user content labeling module 309. In some implementations, the user and content classification module 307 may send the user content to the manual review module 313 (typically when the user and content classification module 307 cannot make a decision on whether content is spam or other abuse with certainty). In some implementations, the user and content classification module 307 may add content to a "blacklist" for future reference. The user and content classification module 307 is described in greater detail below with reference to FIG. 3B.

The user content labeling module 309 may be software including routines for labeling user content. In some implementations, the user content labeling module 309 can be a set of instructions executable by the processor 235 to provide the functionality described below for labeling user content based on a classification. In some implementations, the user content labeling module 309 can be stored in the memory 237 of the social network server 102 and can be accessible and executable by the processor 235. In either implementation, the user content labeling module 309 can be adapted for cooperation and communication with the processor 235, the communication unit 241, data storage 239 and other components of the social network server 102 (*a-n*), via the bus 220.

In some implementations, the user content labeling module 309 may receive a decision (i.e., "verdict") from the user and content classification module 307. In some implementations, the user content labeling module 309 may then label the underlying user content based on the decision from the user and content classification module 307. For example, if the decision indicates that the content is spam, the user content labeling module 309 labels the user content as spam. In the event the score (described with reference to FIG. 3B) is under a pre-defined threshold, the user content labeling module 309 labels the underlying user content as valid (i.e., good). In some implementations, the spam label may be used to filter and/or remove user content from the social network (for example, ban users, remove spam, etc.).

The feedback module 311 is software including routines for providing feedback. In some implementations, the feedback module 311 can be a set of instructions executable by the processor 235 to provide the functionality described below for providing feedback based on a decision on user content. In other implementations, the feedback module 311 can be stored in the memory 237 of the social network server 102 (*a-n*) and can be accessible and executable by the processor 235. In either implementation, the feedback module 311 can be adapted for cooperation and communication with the processor 235, the communication unit 241, data storage 239, and other components of the social network server 102, via the bus 220.

In some implementations, the feedback module 311 may receive a decision from the user and content classification module 307 and provide feedback based on the decision to the execution module 315. As one example, the feedback module 311 may receive the decision to delete the user content and provides feedback to the execution module 315 to delete the user content.

The manual review module 313 is software including routines for sending user content for manual review. In some implementations, the manual review module 313 can be a set of instructions executable by the processor 235 to provide the functionality described below for sending user content to one or more reviewers for manual review. In other implementations, the manual review module 313 can be stored in the memory 237 of the social network server 102 (*a-n*) and can be accessible and executable by the processor 235. In either implementation, the manual review module 313 can be adapted for cooperation and communication with the processor 235, the communication unit 241, data storage 239 and other components of the social network server 102, via the bus 220.

In some implementations, the decision is not computed and the manual review module 313 sends the user content to one or more reviewers (e.g., a human reviewer) for manual review. As one example, in the event the user and content classifying module 307 cannot determine (with certainty) that the user content is spam or abuse and it may therefore send the user content to the manual review module 313, which sends the user content to a human reviewer to determine whether the content is spam or other abuse. In some implementations, the manual review is invoked based on one or more flags and/or complaints about the user content.

The execution module 315 is software including routines for executing one or more actions. In some implementations, the execution module 315 can be a set of instructions executable by the processor 235 to provide the functionality described below for executing one or more actions on user content based on whether the content is labeled as spam. In other implementations, the execution module 315 can be stored in the memory 237 of the social network server 102 (a-n) and can be accessible and executable by the processor 235. In either implementation, the execution module 315 can be adapted for cooperation and communication with the processor 235, the communication unit 241, data storage 239 and other components of the social network server 102 (a-n), via the bus 220.

In some implementations, the execution module 315 executes a decision on the user content. For example, the execution module 315 receives a decision to delete user content from the user and content classifying module 307 and/or the manual review module 313 and deletes the user content from the social network. In some implementations, the execution module 315 may execute one or more of the following actions, for example, take no action, modify the user content, notify a user of spam content, etc.

Figure 3B:
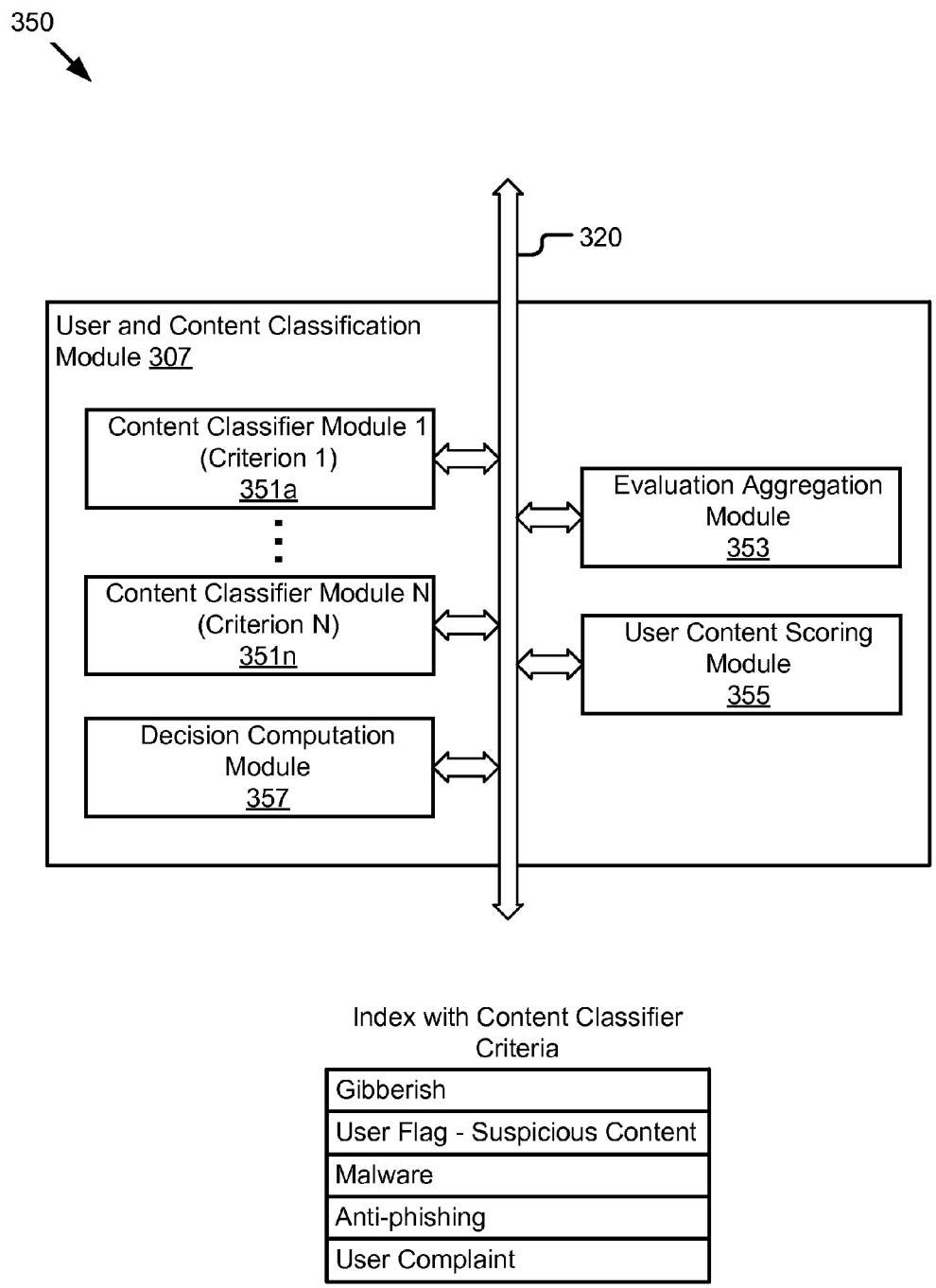
FIG. 3B is a block diagram illustrating an example user and content classification module and its software components.

Referring now to FIG. 3B, like reference numerals have been used to reference like components with the same or similar functionality that has been described above with reference to FIGS. 1, 2, and 3A. As those components have been described above that description is not repeated here. The user and content classification module 307, indicated here by reference numeral 350, includes various applications or engines that are programmed to perform the functionalities described here. The content classifier modules 351a through 351n classifies content based on pre-defined criteria. The evaluation-aggregation module 353 aggregates information received from the one or more content classifier modules 351a through 351n. The user-content scoring module 355 generates a score based on indications by the content (spam) determination model. The decision computation module 357 computes a decision based on the score.

The content classifier module 351a-351n is software including routines for classifying content. In some implementations, the content classifier module 351a-351n can be a set of instructions executable by the processor 235 to provide the functionality described below for classifying content based on one or more pre-defined criteria. In other implementations, the content classifier module 351a-351n can be stored in the memory 237 of the social network server 102 and/or the third party server 134 and can be accessible and executable by the processor 235. In either implementation, the content classifier module 351a-351n can be adapted for cooperation and communication with the processor 235, the communication unit 241, data storage 239 and other components of the social network server 102 and/or the third party server 134 via the bus 220.

In some implementations, content classifier module 351a-351n classifies the user content (for example, determines whether content is/includes spam) based on one or more criteria. For example, a content classifier module 351a may determine if user content includes gibberish, a content classifier module 351b may determine whether user content includes malware, a content classifier module 351c may determine whether user content includes javascript redirects, a content classifier module 351d may determine whether user content includes phishing content, and a content classifier module 351n may determine whether user content includes any other content that may be perceived as spam.

The evaluation-aggregation module 353 is software including routines for aggregating evaluation information. In some implementations, the evaluation aggregation module 353 can be a set of instructions executable by the processor 235 to provide the functionality described below for aggregating evaluation information from one or more evaluations. In other implementations, the evaluation aggregation module 353 can be stored in the memory 237 of the social network server 102 (a-n) and can be accessible and executable by the processor 235. In either implementation, the evaluation-aggregation module 353 can be adapted for cooperation and communication with the processor 235, the communication unit 241, data storage 239 and other components of the social network server 102 (a-n), via the bus 220.

In some implementations, the evaluation-aggregation module 353 aggregates one or more classifications (i.e., evaluations) from the one or more content classifier modules 351a through 351n. For example, the aggregation module 353 aggregates the classifications and the sends the aggregated classifications to the user content scoring module 355.

The user content scoring module 355 is software including routines for scoring user content. In some implementations, the user content scoring module 355 can be a set of instructions executable by the processor 235 to provide the functionality described below for scoring user content based on indications by the content (spam) determination model. In other implementations, the user content scoring module 355 can be stored in the memory 237 of the social network server 102 and can be accessible and executable by the processor 235. In either implementation, the user content scoring module 355 can be adapted for cooperation and communication with the processor 235, the communication unit 241, data storage 239, and other components of the social network server 102, via the bus 220.

In some implementations, the user content scoring module 355 receives information from the user and other modules of the user and content classification module 307 and may determine whether certain user content may be spam. For example, the user content scoring module 355 may calculate a score between "0" and "1" based on the information from the other modules of the user and content classification module 307 and the content (spam) determination model. It should be recognized that different scoring schemes may be used to variously classify content. In some implementations, a spam model is software configured to automatically determine whether certain content is spam. In some implementations, the spam model may be improved over time upon previously determining spam. In some implementations, the user content scoring module 355 may send the calculated score to the decision computation module 357.

The decision computation module 357 is software including routines for computing a decision. In some implementations, the decision computation module 357 can be a set of instructions executable by the processor 235 to provide the functionality described below for computing a decision to perform an action with respect to user content. In other implementations, the decision computation module 357 can be stored in the memory 237 of the social network server 102 (a-n) and can be accessible and executable by the processor 235. In either implementation, the decision computation module 357 can be adapted for cooperation and communication with the processor 235, the communication unit 241, data storage 239, and other components of the social network server 102 (a-n), via the bus 220.

In some implementations, the decision computation module 357 receives information from other modules of the user and content classification module 307 and automatically computes a "verdict" on whether user content may be spam. For example, in the simplest case, the decision computation module 357 deletes user content or takes no action. The decision computation module 357 then sends the "verdict" to the user content labeling module 309.

Figure 4A:
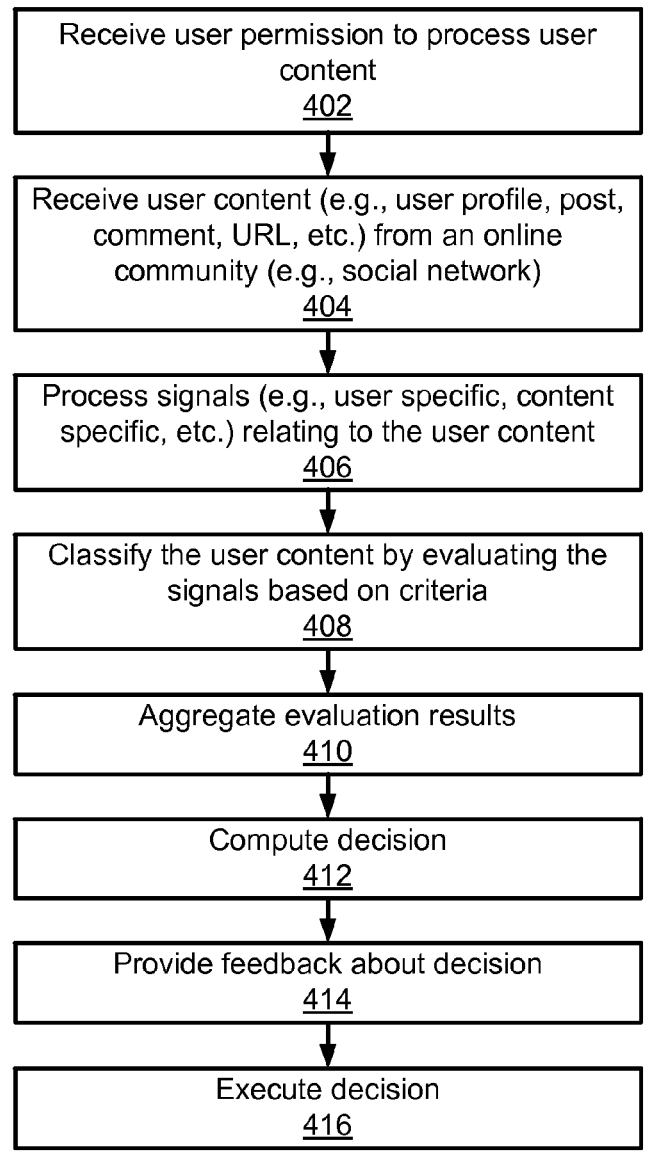
FIG. 4A is a flowchart of an example method for processing signals to determine spam.

FIG. 4A is a flow chart illustrating an example method 400 for processing signals to determine spam or abuse. Any one or more of the operations indicated in the illustrated methods may be arranged in a different order or may be excluded from the method. In the method illustrated, one or more operations of the method 400 include receiving user permission to obtain user content, as illustrated by block 402. The method 400 proceeds to the next block 404, at which stage, one or more operations of the method include receiving user content (for example, user profile, post, comment, URL, etc.) from an online community (for example, a social network). The method 400 proceeds to the next block 406, at which point, one or more operations of the method include processing signals (for example, user-specific signals, content-specific signals, etc.) relating to the user content. The method 400 proceeds to the next block 408, at which point, one or more operations of the method 400 include classifying the user content by evaluating the signals based on criteria that may be predetermined or pre-defined. The method 400 proceeds to the next block 410, where, one or more operations of the method 400 include, aggregating evaluation results. The method 400 proceeds to the next block 412, where, one or more operations of the method 400 include, computing a decision. The method 400 proceeds to the next block 414, where, one or more operations of the method 400 include providing feedback about the decision. The method 400 proceeds to the next block 416, where, one or more operations of the method 400 include, executing the decision.

Figure 4B:
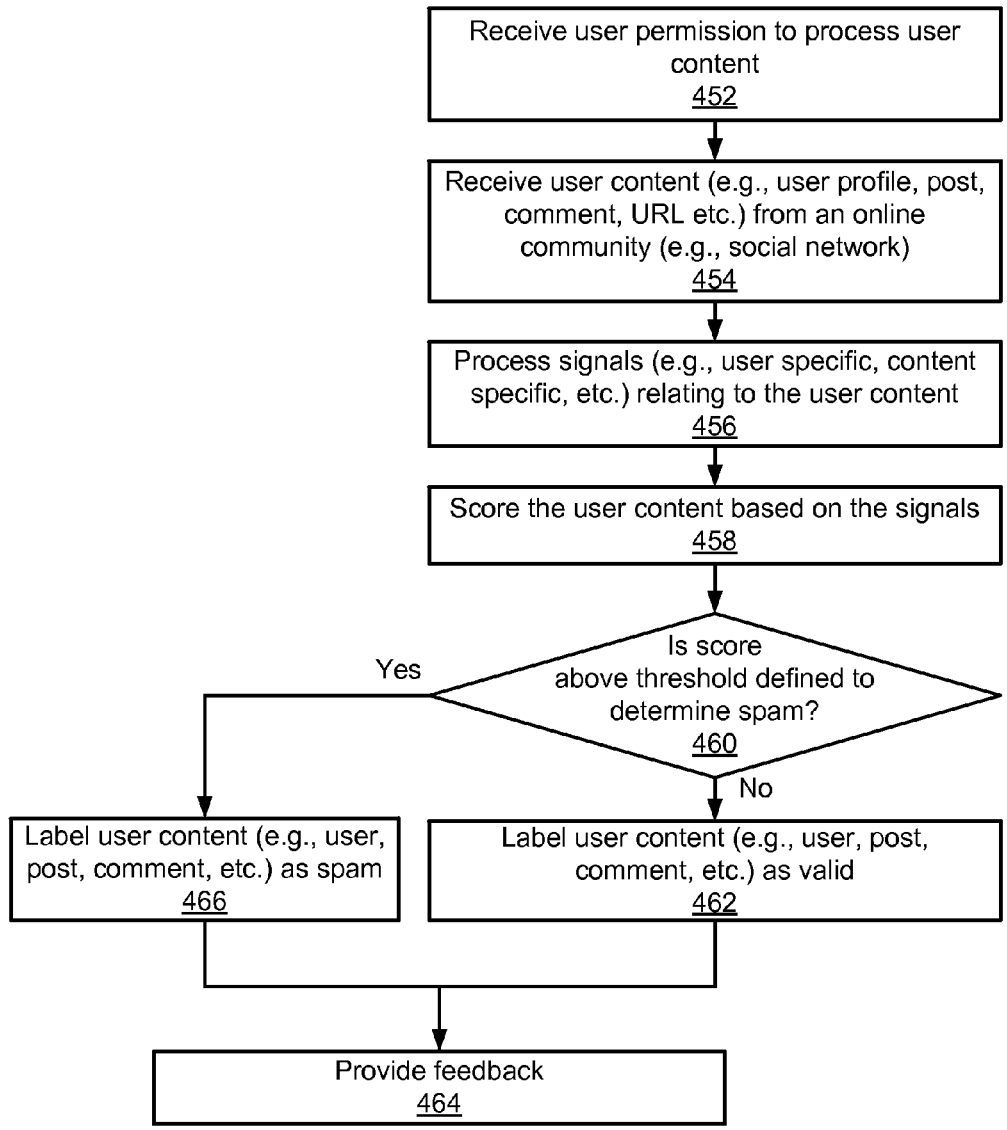
FIG. 4B is a flowchart of a second example method for processing signals to determine spam.

FIG. 4B is a flow chart illustrating a second example method 450 for processing signals to determine spam. In the method illustrated, one or more operations of the method 450 include receiving user permission to obtain user content, as illustrated by block 452. The method 450 proceeds to the next block 454, at which stage, one or more operations of the method include receiving user content (for example, user profile, post, comment, URL, etc.) from an online community (for example, social network). The method 450 proceeds to the next block 456, at which point, one or more operations of the method includes processing signals (for example, user-specific signals, content-specific signals, etc.) relating to the user content. The method 450 proceeds to the next block 458, at which point, one or more operations of the method 450 includes scoring the user content based on the signals processed (user-specific and/or content specific). The method 450 proceeds to the next block 460, where, one or more operations of the method 450 include, determining whether the score accorded is above threshold levels that are defined to classify content, for example, a particular threshold level may determine spam. If the score is not above the threshold level, the method 450 proceeds to the next block 462, where, one or more operations of the method 450 include, labeling the user content (for example, user, post, comment, etc.) as valid. The method 450 then proceeds to the next block 464, where, one or more operations of the method 450 include providing feedback about the decision. If the score is above the threshold, the method 450 proceeds to the next block 466, where, one or more operations of the method 450 include labeling the user content (for example, user, post, comment, etc.) as spam or otherwise unacceptable or not valid. The method 450 then proceeds to the next block 464, where, one or more operations of the method 450 include providing feedback about the decision. It should be recognized that any of the operations illustrated by the blocks of FIGS. 4A and 4B may be arranged in different orders to create different implementations of the present disclosure.

Figure 5:
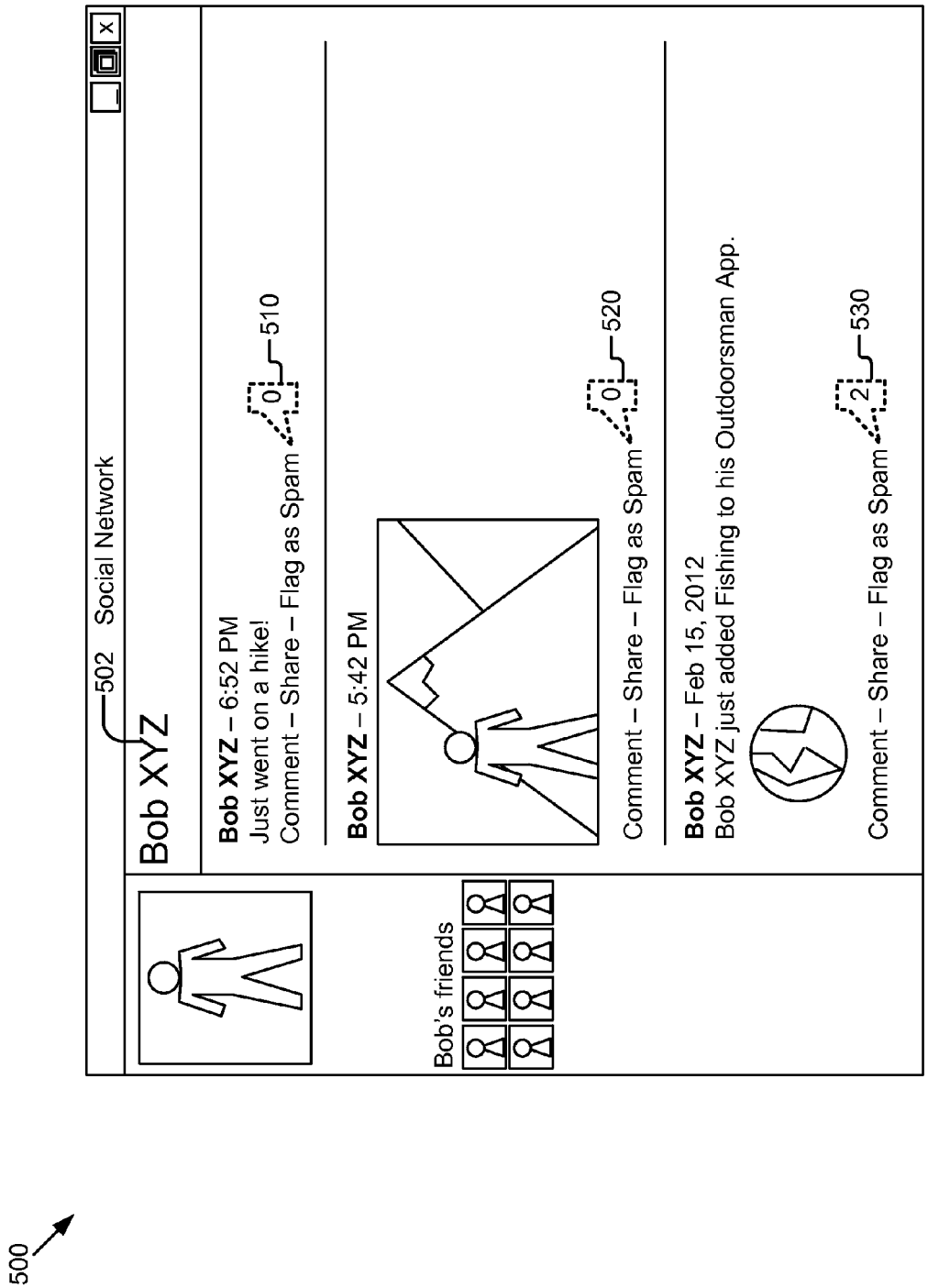
FIG. 5 is a graphic representation of an example user interface for determining whether content may be spam.

FIG. 5 is a graphic representation of an example user interface for determining whether content may be spam. The user interface 500 that is illustrated includes a user's social stream (in this instance, Bob XYZ's social stream) indicated by reference numeral 502, including three examples of posts. Below each post, there is a visual display, button, icon, or link that indicates features to "comment," "share," and "flag as spam." This information can be received by the social signal processing module 305 to determine whether the user content (i.e., the post) may be spam or not. In other implementations, other information (e.g., user name, user's friend information, etc.) may be used by the social signal processing module 305 to determine whether the user content (i.e., the post) may be spam or not. In the illustrated example, the first post's "flag as spam" link 510 has been pressed "0" times and therefore, it is determined that it most likely is not spam. In this example, the second post's "flag as spam" link 520 has been pressed "0" times and therefore, it is determined that it is most likely not spam as well. In this example, the third post's flag as spam link 530 has been pressed "2" times and therefore, there may be the possibility that it is spam.

Figure 6:
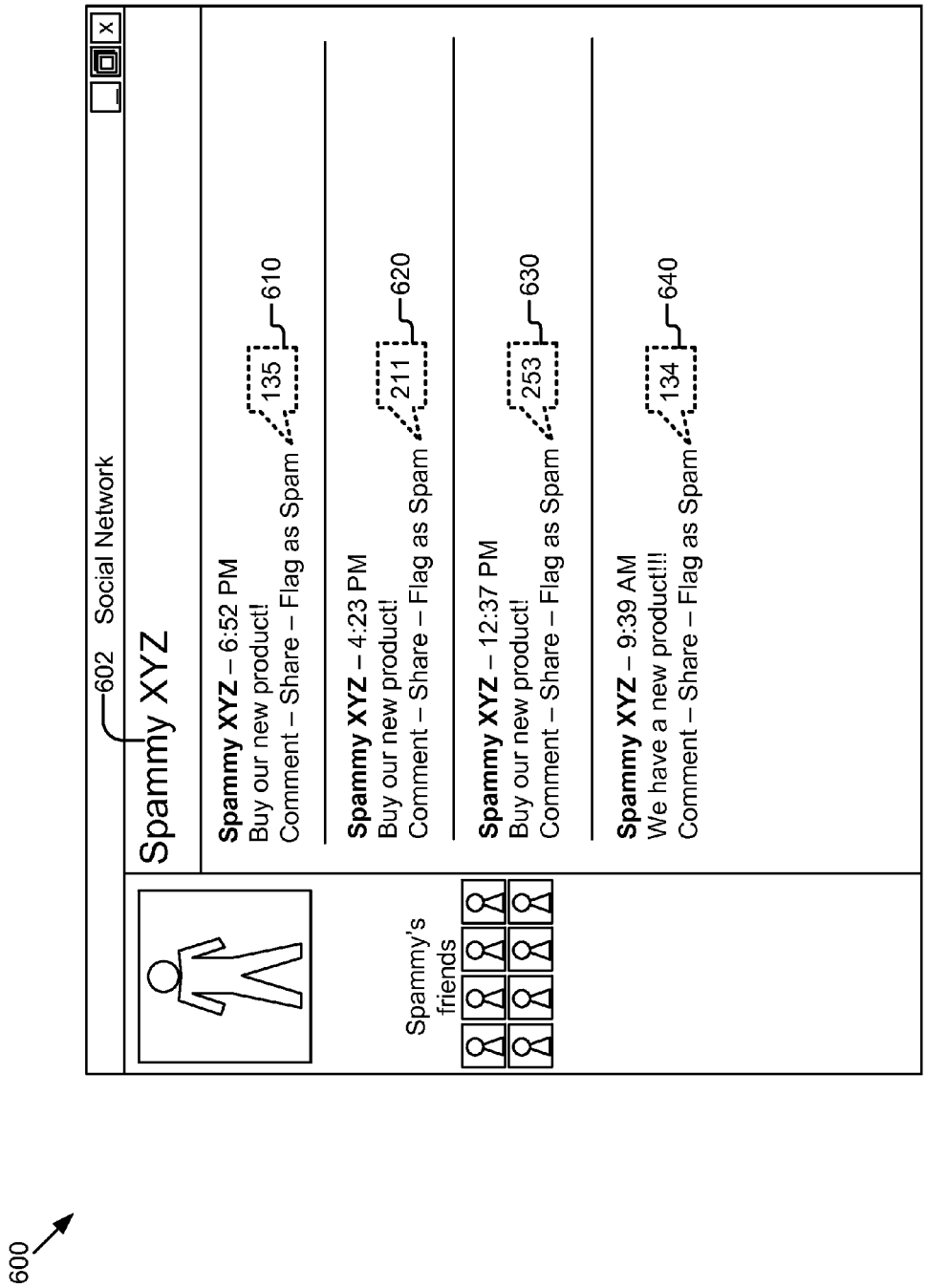
FIG. 6 is a graphic representation of an example user interface for determining whether content may be spam.

FIG. 6 is a graphic representation of an example user interface for determining whether particular content may be classified as spam. The user interface 600 includes a user's social stream 602 (in this instance, Spammy XYZ) including four example posts. Below each post, there are visual displays, buttons, icons, or links that indicate features, for example, to "comment," "share," and "flag as spam." This information can be received by the social signal processing module 305 to determine whether the user content (i.e., the post) may be spam or not. In other implementations, other information (e.g., user name, user's friend information, etc.) may be used by the social signal processing module 305 to determine whether the user content (i.e., the post) may be spam or not. In this example, the first post's "flag as spam" link 610 has been pressed "135" times and therefore, it is determined that it is most likely spam. In this example, the second post's "flag as spam" link 620 has been pressed "211" times and therefore, it is most likely spam. In this example, the third post's "flag as spam" link 630 has been pressed "253" times and therefore, it is most likely spam. In this example, the fourth post's "flag as spam" link 640 has been pressed 134 times and therefore, it is most likely spam.

Figure 7:
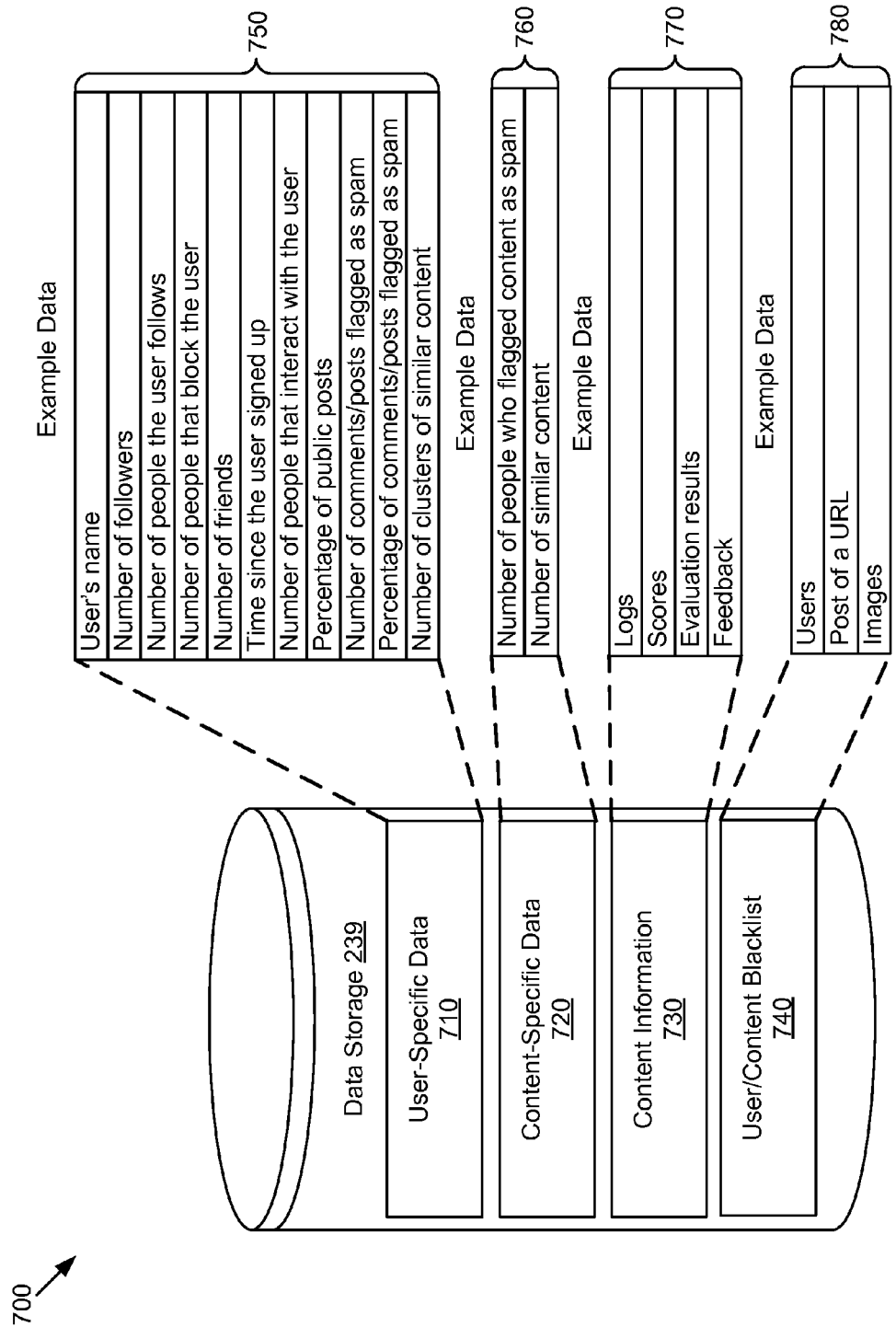
FIG. 7 is a graphic representation of example data stored in a data storage device.

FIG. 7 is a graphic representation of example data stored in a data storage device. The graphic representation 700 includes example data storage 239. The data storage 239 includes user-specific data 710, content-specific data 720, content information 730, and user/content blacklist 740. The user-specific data 710 includes example data 750, the content-specific data 720 includes example data 760, content information 730 includes example data 770, and user/content blacklist 740 includes example data 780. The example data 750 includes a user's name, number of followers, number of people that the user follows, number of people that block the user, number of friends, time since the user signed up, number of people that interact with the user, percentage of public posts, number of comments/posts flagged as spam, and number of clusters of similar content. The example data 760 includes an indication of a number of people who flagged the content as spam and an indication of a number of similar content. The example data 770 includes logs, scores, evaluation results, and feedback. The example data 780 includes users, post of a URL, and images.

In the preceding description, for purposes of explanation, numerous specific details are indicated in order to provide a thorough understanding of the technology described. It should be apparent, however, that this technology can be practiced without these specific details. In other instances, structures and devices are shown in block diagram form in order to avoid obscuring the technology. For example, the present technology is described with some implementations above with reference to user interfaces and particular hardware. However, the present technology applies to any type of computing device that can receive data and commands, and any devices providing services. Moreover, the present technology is described above primarily in the context of providing support for determining spam or abuse within a social network; however, it should be understood that the present technology applies to any type of user-generated content in a web service and may be used for other applications beyond social networks. In particular, this technology for determining spam or abuse may be used in other contexts besides social networks.

Reference in the specification to "one implementation," "an implementation," or "some implementations" means simply that one or more particular features, structures, or characteristics described in connection with the one or more implementations is included in at least one or more implementations that are described. The appearances of the phrase "in one implementation" in various places in the specification are not necessarily all referring to the same implementation.

Some portions of the detailed descriptions that follow are presented in terms of algorithms and symbolic representations of operations on data bits within a computer memory of either one or more computing devices. These algorithmic descriptions and representations are the means used by those in the data processing arts to most effectively convey the substance of their work to others in the art. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms for example "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may comprise a general-purpose computer selectively activated or reconfigured by a computer program stored in the computer. Such a computer program may be stored in a computer-readable storage medium, for example, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology can take the form of an entirely hardware implementation, an entirely software implementation, or an implementation including both hardware and software components. In some implementations, this technology is implemented in software, which includes but is not limited to firmware, resident software, microcode, etc.

Furthermore, this technology can take the form of a computer program product accessible from a computer-usable or computer-readable medium providing program code for use by or in connection with a computer or any instruction execution system. For the purposes of this description, a computer-usable or computer-readable medium may be any apparatus that can include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

The foregoing description of the implementations of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood, the present technology may be embodied in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, the modules, routines, features, attributes, methodologies, and other aspects of the present technology can be implemented as software, hardware, firmware, or any combination of the three. Also, wherever a component, an example of which is a module, of the present technology may be implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A method comprising:
   receiving, using at least one computing device, user content associated with a user in an online community;
   processing, using the at least one computing device, content-specific signals relating to the received user content and user-specific signals relating to a reputation associated with the user to generate processed signals;
   defining, using the at least one computing device, a threshold level of score to classify content into a classification;
   calculating, using the at least one computing device, a score for the received user content using the processed signals;
   classifying using the at least one computing device, the received user content into the classification based on the score and the defined threshold level of score;
   computing, using the at least one computing device, a decision to perform an action on the received user content, based on the classification; and
   executing, using the at least one computing device, the decision on the received user content.

2. The method according to claim 1, wherein the content-specific signals relate to the frequency of the content and reaction to the content by others and wherein the user-specific signals inform on the user's patterns.

3. The method according to claim 1, wherein the classifying further comprises:
   testing, using the at least one computing device, the score for the user content to determine if it is less than the defined threshold level of score; and
   labeling the user content as valid.

4. The method according to claim 1, wherein the classifying further comprises:
   testing, using the at least one computing device, the score for the user content to determine if it is more than the defined threshold level of score; and
   labeling the user content as spam.

5. The method according to claim 1, wherein the user-specific signals are continuously processed to update the classification.

6. The method according to claim 1, wherein the content-specific signals are continuously processed to update the classification.

7. The method according to claim 1, wherein the user content includes at least one of a group of users, comments, and posts.

8. A computer program product comprising a non-transitory computer usable medium including a computer readable program, wherein the computer readable program when executed on a computer causes the computer to:
   receive user content associated with a user in an online community;
   process content-specific signals relating to the received user content and user-specific signals relating to a reputation associated with the user to generate processed signals;
   define a threshold level of score to classify content into a classification;
   calculate a score for the received user content using the processed signals;
   classify the received user content into the classification based on the score and the defined threshold level of score;
   compute a decision to perform an action on the received user content, based on the classification; and
   execute the decision on the received user content.

9. The computer program product according to claim 8, wherein the content-specific signals relate to the frequency of the content and reaction to the content by others and wherein the user-specific signals inform on the user's patterns.

10. The computer program product according to claim 8, wherein to classify further comprises:
    testing, using the at least one computing device, the score for the user content to determine if it is less than the defined threshold level of score; and
    labeling the user content as valid.

11. The computer program product according to claim 8, wherein to classify further comprises:
    testing, using the at least one computing device, the score for the user content to determine if it is more than the threshold level of score; and
    labeling the user content as spam.

12. The computer program product according to claim 8, wherein the user-specific signals are continuously processed to update the classification.

13. The computer program product according to claim 8, wherein content-specific signals are continuously processed to update the classification.

14. The computer program product according to claim 8, wherein the user content includes at least one of a group of users, comments, and posts.

15. A system, comprising:
    a processor, and;
    a memory storing instructions that, when executed, cause the system to:
      receive user content associated with a user within an online community;
      process content-specific signals relating to the received user content and user-specific signals relating to a reputation associated with the user to generate processed signals;
      define a threshold level of score to classify the user content into a classification;
      calculate a score for the received user content using the processed signals;
      classify the received user content into the classification based on the score and the defined threshold level of score;
      compute a decision to perform an action on the received user content, based on the classification; and
      execute the decision on the received user content.

16. The system according to claim 15, wherein the memory further stores instructions that, when executed, cause the system to classify by:

testing the score for the user content to determine if it is less than the defined threshold level of score; and labeling the user content as valid.

17. The system according to claim 15, wherein the memory further stores instructions that, when executed, cause the system to classify by:

testing the score for the user content to determine if it is more than the defined threshold level of score; and labeling the user content as spam.

18. The system according to claim 15, wherein the user-specific signals are continuously processed to update the classification.

19. The system according to claim 15, wherein the content-specific signals are continuously processed to update the classification.

20. The system according to claim 15, wherein the user content includes at least one from a group of users, comments, and posts.

\* \* \* \* \*